(12) United States Patent
Grocutt et al.

(10) Patent No.: US 11,704,127 B2
(45) Date of Patent: Jul. 18, 2023

(54) MARKING CURRENT CONTEXT DATA TO CONTROL A CONTEXT-DATA-DEPENDENT PROCESSING OPERATION TO SAVE CURRENT OR DEFAULT CONTEXT DATA TO A DATA LOCATION

(71) Applicant: ARM LIMITED, Cambridge (GB)

(72) Inventors: Thomas Christopher Grocutt, Cambridge (GB); François Christopher Jacques Botman, Cambridge (GB); Bradley John Smith, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/628,418

(22) PCT Filed: Jun. 19, 2018

(86) PCT No.: PCT/GB2018/051701
§ 371 (c)(1),
(2) Date: Jan. 3, 2020

(87) PCT Pub. No.: WO2019/008323
PCT Pub. Date: Jan. 10, 2019

(65) Prior Publication Data
US 2020/0167160 A1 May 28, 2020

(30) Foreign Application Priority Data
Jul. 5, 2017 (GB) ..................................... 1710790

(51) Int. Cl.
*G06F 9/312* (2018.01)
*G06F 9/46* (2006.01)
*G06F 9/30* (2018.01)

(52) U.S. Cl.
CPC ........ *G06F 9/30043* (2013.01); *G06F 9/3013* (2013.01); *G06F 9/30189* (2013.01); *G06F 9/461* (2013.01)

(58) Field of Classification Search
CPC .. G06F 9/30043; G06F 9/30189; G06F 9/461; G06F 9/3013
See application file for complete search history.

(56) References Cited

U.S. PATENT DOCUMENTS 5,481,719 A   1/1996  Ackerman et al.
5,682,531 A * 10/1997 Nakamura ............ G06F 9/3861
                                                       718/108
(Continued)

FOREIGN PATENT DOCUMENTS

CN    1052740      7/1991
CN    101430376    5/2009
(Continued)

OTHER PUBLICATIONS

International Search Report and Written Opinion of the ISA for PCT/GB2018/051701 dated Sep. 17, 2018, 12 pages.
(Continued)

Primary Examiner — David J. Huisman
(74) Attorney, Agent, or Firm — Nixon & Vanderhye P.C.

(57) ABSTRACT

A data processing system includes processing circuitry for executing context-data-dependent program instructions which are decoded by decoder circuitry. Such context-data-dependent program instructions perform processing which is dependent upon currently existing context data. As an example, the context-data-dependent program instructions may be floating point instructions and the context data may be rounding mode information. The decoder circuitry supports a context save instruction which saves context data when it is marked as having been used and saves default context data when the current context data is marked as not
(Continued)

having been used. The decoder circuitry further supports a context restore instruction which restores context data when the current context data is marked as having been used and permits the current context data to continue for future use when it is marked as currently unused.

17 Claims, 5 Drawing Sheets

(56) References Cited

U.S. PATENT DOCUMENTS

| | | | |
|---|---|---|---|
| 5,987,495 | A | 11/1999 | Ault et al. |
| 2004/0181653 | A1 | 9/2004 | McGrath et al. |
| 2010/0095091 | A1 | 4/2010 | Asanaka |
| 2010/0325397 | A1 | 12/2010 | Craske |
| 2013/0042093 | A1 | 2/2013 | Van Dyke et al. |
| 2014/0244985 | A1 | 8/2014 | Swanberg |
| 2016/0253196 | A1* | 9/2016 | van Riel ............... G06F 9/4812 718/1 |

FOREIGN PATENT DOCUMENTS

| | | |
|---|---|---|
| CN | 102043608 | 5/2011 |
| CN | 102063286 | 5/2011 |
| CN | 102460377 | 5/2012 |
| CN | 104240285 | 12/2014 |
| GB | 2471138 | 12/2010 |
| GB | 2540388 | 1/2017 |
| JP | H5-165652 | 7/1993 |
| JP | H8-95804 | 4/1996 |
| JP | 2012-530315 | 11/2012 |
| KR | 10-2012-0052934 | 5/2012 |
| TW | I522908 | 2/2016 |
| TW | 201610841 | 3/2016 |
| WO | 2017/009597 | 1/2017 |

OTHER PUBLICATIONS

Combined Search and Examination Report for GB1710790.5 dated Jan. 5, 2018, 7 pages.
Office Action for EP Application No. 18734927.9 dated Mar. 24, 2021, 6 pages.
Office Action for IN Application No. 202047003538 dated Mar. 10, 2022, 8 pages.
Office Action for EP Application No. 18734927.9 dated Apr. 4, 2022, 11 pages.
Office Action for JP Application No. 2019-572679 dated Jun. 21, 2022 and English translation, 8 pages.
Intel Corporation, Intel Architecture Software Developer's Manual, Second volume: Instruction Set Reference, CQ Publishing Co., Ltd., 1997, pp. 3-38 to 3-48, pp. 3-218-3-221.
Intel Corporation, Software Developer's Manual, Third volume: System Programming Guide, CQ Publishing Co., Ltd., 1997, pp. 5-38 to 5-39, pp. 6-10 to 6-20 and Abridged English translation.
Office Action for TW Application No. 107122288 dated Jul. 21, 2022 and English translation, 16 pages.
Office Action for TW Application No. 107122288 dated Nov. 30, 2022 and English translation, 14 pages.
Office Action for IL Application No. 271662 dated Dec. 25, 2022, 4 pages.
Office Action for KR Application No. 10-2020-7002695 dated Dec. 19, 2022 and English translation, 18 pages.
Office Action for JP Application No. 2019-572679 dated Dec. 27, 2022 and English translation, 4 pages.
First Office Action for CN Application No. 201880043850.6 dated Mar. 10, 2023 and English translation, 27 pages.

* cited by examiner

MARKING CURRENT CONTEXT DATA TO CONTROL A CONTEXT-DATA-DEPENDENT PROCESSING OPERATION TO SAVE CURRENT OR DEFAULT CONTEXT DATA TO A DATA LOCATION

This application is the U.S. national phase of International Application No. PCT/GB2018/051701 filed Jun. 19, 2018 which designated the U.S. and claims priority to GB Patent Application No. 1710790.5 filed Jul. 5, 2017, the entire contents of each of which are hereby incorporated by reference.

This disclosure relates to the field of data processing systems. More particularly, this disclosure relates to the management of context data within data processing systems.

It is known to provide data processing systems which execute context-data-dependent program instructions having a behaviour which is dependent upon current context data at the time those instructions are executed. For example, the context-data-dependent program instructions may be floating point arithmetic program instructions and the context data may be configuration data indicating which of a plurality of rounding modes should be used when those floating point arithmetic program instructions are executed.

At least one embodiment of the present disclosure provides apparatus for processing data comprising:
processing circuitry to perform processing operations under control of program instructions; and
decoder circuitry to decode said program instructions to generate control signals to control said processing circuitry to perform said processing operations; wherein
said decoder circuitry is responsive to at least one context-data-dependent program instruction and context data to generate said control signals to control said processing circuitry to perform a context-data-dependent processing operation specified by said context-data-dependent program instruction and said context data, wherein
said decoder circuitry is responsive to a context save instruction:
when said context data is marked as having been used to control a context-data-dependent processing operation, to control said processing circuitry to save said context data; and
when said context data is marked as having been unused to control a context-data-dependent processing operation, to control said processing circuitry to save default context data.

At least one embodiment of the present disclosure provides apparatus for processing data comprising:
processing circuitry to perform processing operations under control of program instructions; and
decoder circuitry to decode said program instructions to generate control signals to control said processing circuitry to perform said processing operations; wherein
said decoder circuitry is responsive to at least one context-data-dependent program instruction and context data to generate said control signals to control said processing circuitry to perform a context-data-dependent processing operation specified by said context-data-dependent program instruction and said context data, wherein
said decoder circuitry is responsive to a context restore instruction:
when said context data is marked as having been used to control a context-data-dependent processing operation, to control said processing circuitry to restore said context data using stored context data; and
when said context data is marked as having been unused to control a context-data-dependent processing operation, to control said processing circuitry to preserve said context data.

At least one embodiment of the present disclosure provides apparatus for processing data comprising:
processing means for performing processing operations under control of program instructions; and
decoder means for decoding said program instructions to generate control signals to control said processing means to perform said processing operations; wherein
said decoder means is responsive to at least one context-data-dependent program instruction and context data to generate said control signals to control said processing means to perform a context-data-dependent processing operation specified by said context-data-dependent program instruction and said context data, wherein
said decoder means is responsive to a context save instruction:
when said context data is marked as having been used to control a context-data-dependent processing operation, to control said processing means to save said context data; and
when said context data is marked as having been unused to control a context-data-dependent processing operation, to control said processing means to save default context data.

At least one embodiment of the present disclosure provides apparatus for processing data comprising:
processing means for performing processing operations under control of program instructions; and
decoder means for decoding said program instructions to generate control signals to control said processing means to perform said processing operations; wherein
said decoder means is responsive to at least one context-data-dependent program instruction and context data to generate said control signals to control said processing means to perform a context-data-dependent processing operation specified by said context-data-dependent program instruction and said context data, wherein
said decoder means is responsive to a context restore instruction:
when said context data is marked as having been used to control a context-data-dependent processing operation, to control said processing means to restore said context data using stored context data; and
when said context data is marked as having been unused to control a context-data-dependent processing operation, to control said processing means to preserve said context data.

At least one embodiment of the present disclosure provides a method of processing data comprising:
performing processing operations with processing circuitry under control of program instructions; and
decoding said program instructions to generate control signals to control said processing circuitry to perform said processing operations; wherein
said decoding is responsive to at least one context-data-dependent program instruction and context data to generate said control signals to control said processing circuitry to perform a context-data-dependent processing operation specified by said context-data-dependent program instruction and said context data, wherein
said decoding is responsive to a context save instruction:
when said context data is marked as having been used to control a context-data-dependent processing operation, to control said processing circuitry to save said context data; and when said context data is marked as having been unused to control a context-data-dependent processing operation, to control said processing circuitry to save default context data.

At least one embodiment of the present disclosure provides a method of processing data comprising:

performing processing operations with processing circuitry under control of program instructions; and decoding said program instructions to generate control signals to control said processing circuitry to perform said processing operations; wherein said decoding is responsive to at least one context-data-dependent program instruction and context data to generate said control signals to control said processing circuitry to perform a context-data-dependent processing operation specified by said context-data-dependent program instruction and said context data, wherein said decoding is responsive to a context restore instruction:

when said context data is marked as having been used to control a context-data-dependent processing operation, to control said processing circuitry to restore said context data using stored context data; and when said context data is marked as having been unused to control a context-data-dependent processing operation, to control said processing circuitry to preserve said context data.

Another example embodiment of the present disclosure may be in the form of a computer program, as may be stored on a non-transitory computer readable medium, for controlling a general purpose computer to operate in accordance with the methods as described above and thereby provide a virtual machine execution environment supporting such methods.

Further aspects, features and advantages of the present technique will be apparent from the following description of examples, which is to be read in conjunction with the accompanying drawings, in which:

FIG. 1 schematically illustrates a data processing system using context-data-dependent program instructions and supporting context management program instructions;

Figure 7:
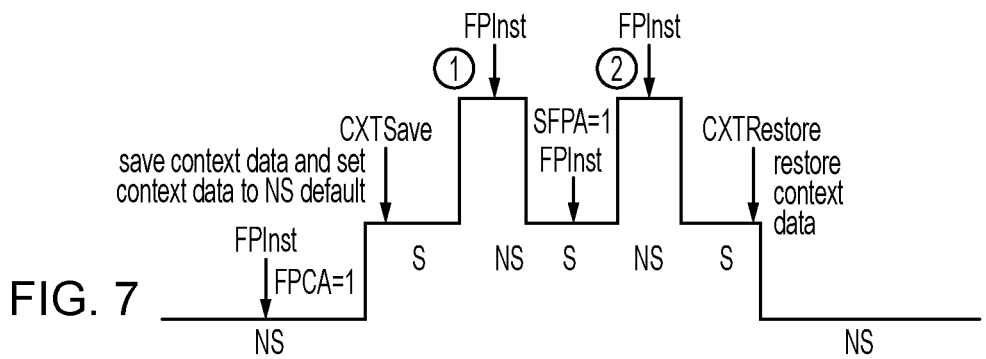
Figure 8:
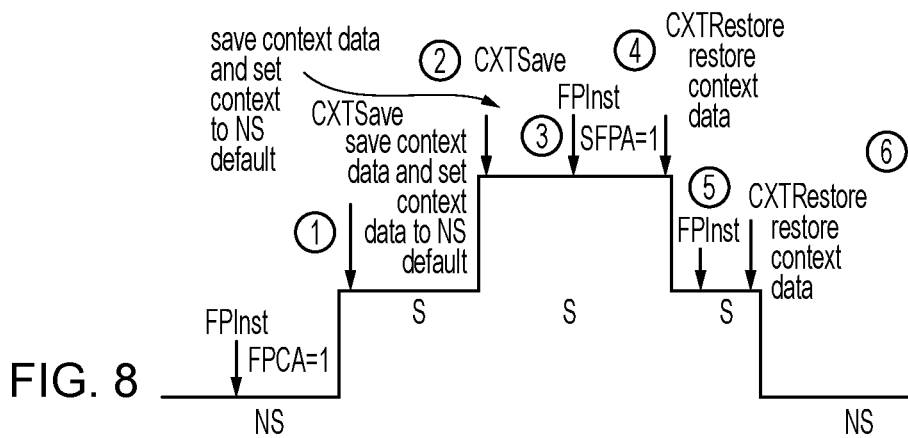
Figure 9:
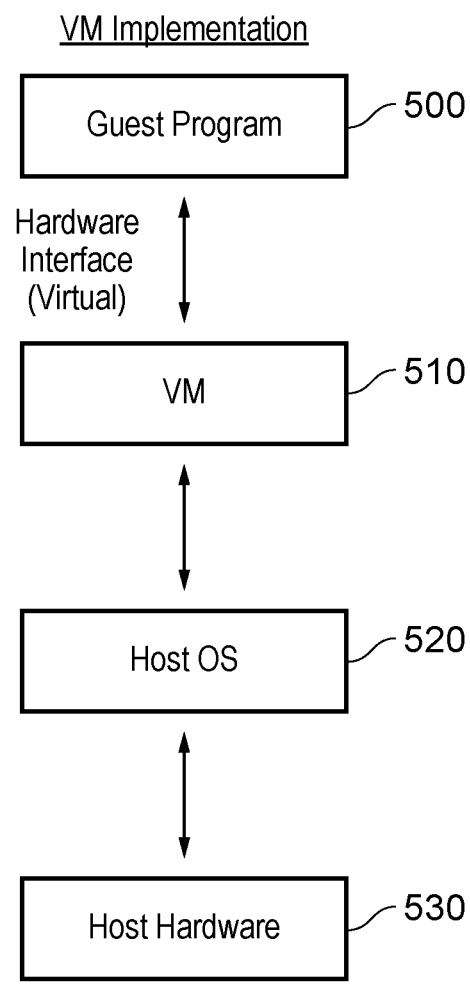

FIGS. 4 to 8 schematically illustrate use of a context save program instruction and a context store program instruction in a variety of different situations; and FIG. 9 schematically illustrates a virtual machine execution environment supporting context-data-dependent program instructions and context data management instructions.

Figure 1:
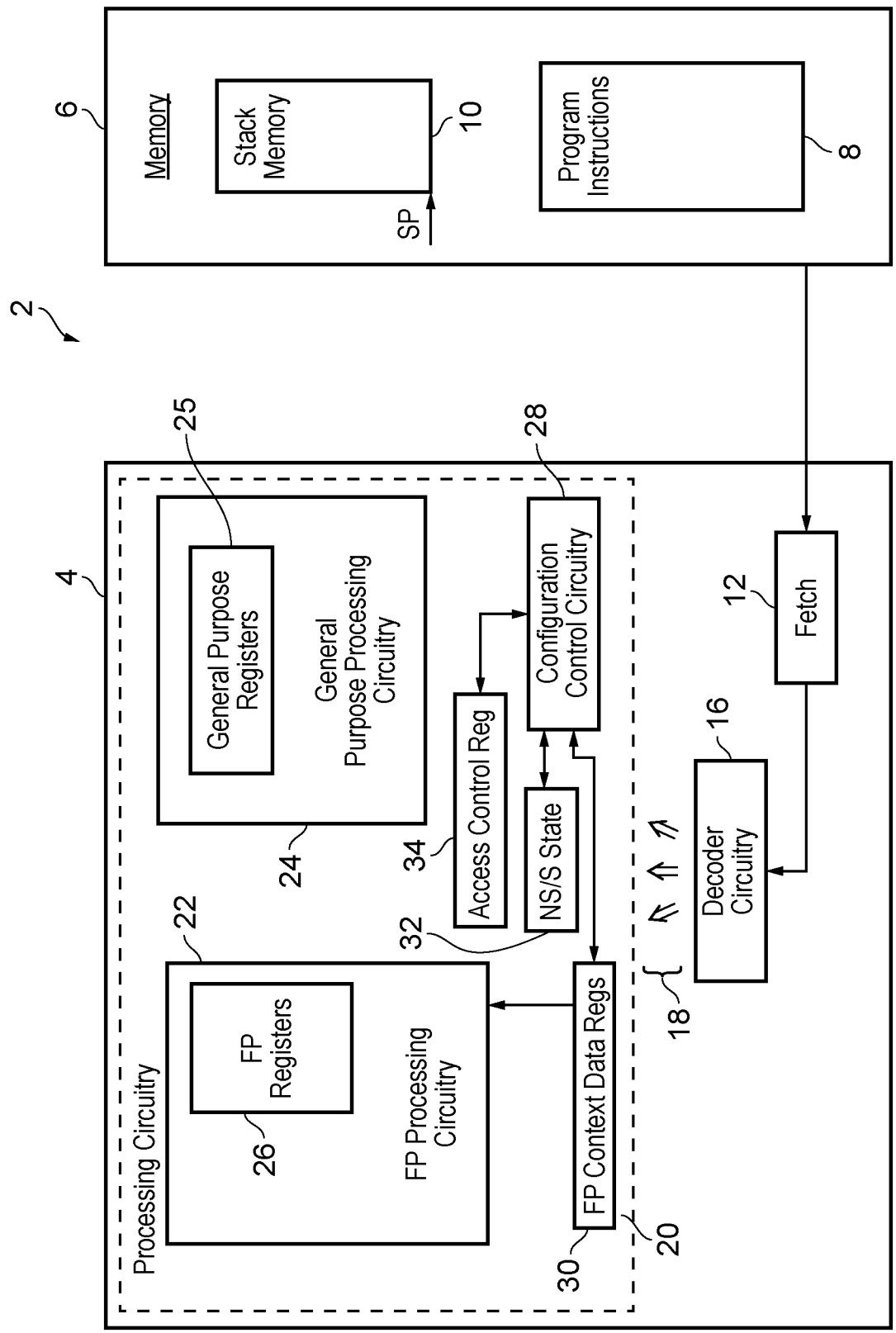

FIG. 1 schematically illustrates a data processing system 2 comprising a processor core 4 and a memory 6. The memory 6 stores program instructions 8 to be executed. The memory 6 includes a stack memory region 10 with an associated stack pointer SP to provide a stack memory into which context data may be saved and from which context data may be restored depending upon the variant of the context data save or context data restore program instruction which is executed.

The processor 4 core will include many functional blocks and the illustration of FIG. 1 includes only some of these blocks for the sake of clarity. Program instructions are fetched from the memory 6 by fetch circuitry 12 from where they are supplied to decoder circuitry 16 which serves to decode those program instructions and generate control signals 18 which are used to control other functional blocks within the processor core 4 to perform the processing operations specified by the decoded program instructions.

The processor core 4 includes processing circuitry 20. In this example illustration, the processing circuitry 20 includes floating point processing circuitry 22 for executing floating point program instructions and general purpose processing circuitry 24 for executing general purpose program instructions (which may include integer program instructions). The floating point processing circuitry 22 includes a floating point register file 26 which serves to store floating point operands which are to be manipulated by the floating point processing circuitry 22. The general purpose processing circuitry 24 includes a general purpose register file 25 which serves to store operands which are to be manipulated by the general purpose processing circuitry 24.

Also included within the processing circuitry 20 is configuration control circuitry 28 which is responsive to a variety of different configuration parameters to control the configuration and operation of the processing circuitry 20. These configuration parameters include floating point context data (FPSCR and SFPA) stored within floating point context data registers 30. Further configuration data may include a NS/S flag stored within a security register 32 which indicates whether the processor core 4 is currently executing within a secure domain or a non-secure domain (such as provided by systems using the Trustzone architecture designed by ARM Limited of Cambridge, England). When operating within a secure domain the processing circuitry 20 has access to secure data. When operating in a non-secure domain, the processing circuitry does not have access to such secure data. An example of such secure data would be data within a memory address region of the memory 6 which was indicated and managed as secure data to be accessible to the processor core 4 when operating in the secure domain and to be inaccessible to the processor core 4 when operating in the non-secure domain.

An access control register 34 stores access control values (CPACR/NSACR) which indicate whether or not the processing circuitry 20 in a current configuration as indicated by those values is permitted or not permitted to use certain processing resources. For example, in dependence upon the values of these access control flags, the processing circuitry 20 may or may not be permitted to use the floating point circuitry 22 at a given point of time. It is also possible that other context configuration flag values may be present and used, such as an ASPEN value which can indicate at a hardware level whether or not the hardware mechanisms of the data processing system 2 will control and monitor the changes of configuration and context data which arise during execution of program instructions which switch between different contexts, domains and modes as well as between different processing threads. For example, if the ASPEN flag has a given value, then the hardware mechanism for managing context data may be disabled and the responsibility for such management is placed upon the software which is executing. In such circumstances, the system may nevertheless provide a backup level of context data management in a manner which may serve, for example, to prevent leaking of data from a secure domain of operation into a non-secure domain of operation, or to create a new context initialized with default context data when a thread first uses floating point.

As previously mentioned, the present techniques relate to the management of context data which at least partially specifies the processing operations to be performed by context-data-dependent program instructions. One example of such context-data-dependent-program instructions are floating point arithmetic program instructions and in this case an example of the context data may be data specifying a particular rounding mode to be used. Other forms of context data are also possible.

The configuration control circuitry 28 uses and manages flags which serve to mark whether context data has or has not been used and whether such context data has or has not been used when operating in the secure domain. More particularly, the configuration control circuitry 28 maintains and uses a flag value FPCA which has a value indicating whether floating point context data has been accessed so as to be used in controlling a floating point instruction. The configuration control circuitry 28 further sets and uses a flag SFPA which is part of the FP context data registers 30 and indicates whether or not a floating point program instruction has been used during secure domain operation. For example, the SFPA may be set to a value of "0" when a switch is made into secure domain operation (for example under program control), and the hardware may change this SFPA flag to "1" when a first floating point program instruction is executed within the secure domain. In this way, it may be possible to support lazy saving of floating point register values since if a switch is made from a secure domain of operation in which floating point manipulations are being performed into a non-secure domain of operation in which no floating point operations are performed, then there is no need to incur the overhead of saving and later restoring the context of the floating point register file 26 if this is untouched during the non-secure domain of operation.

Figure 2:
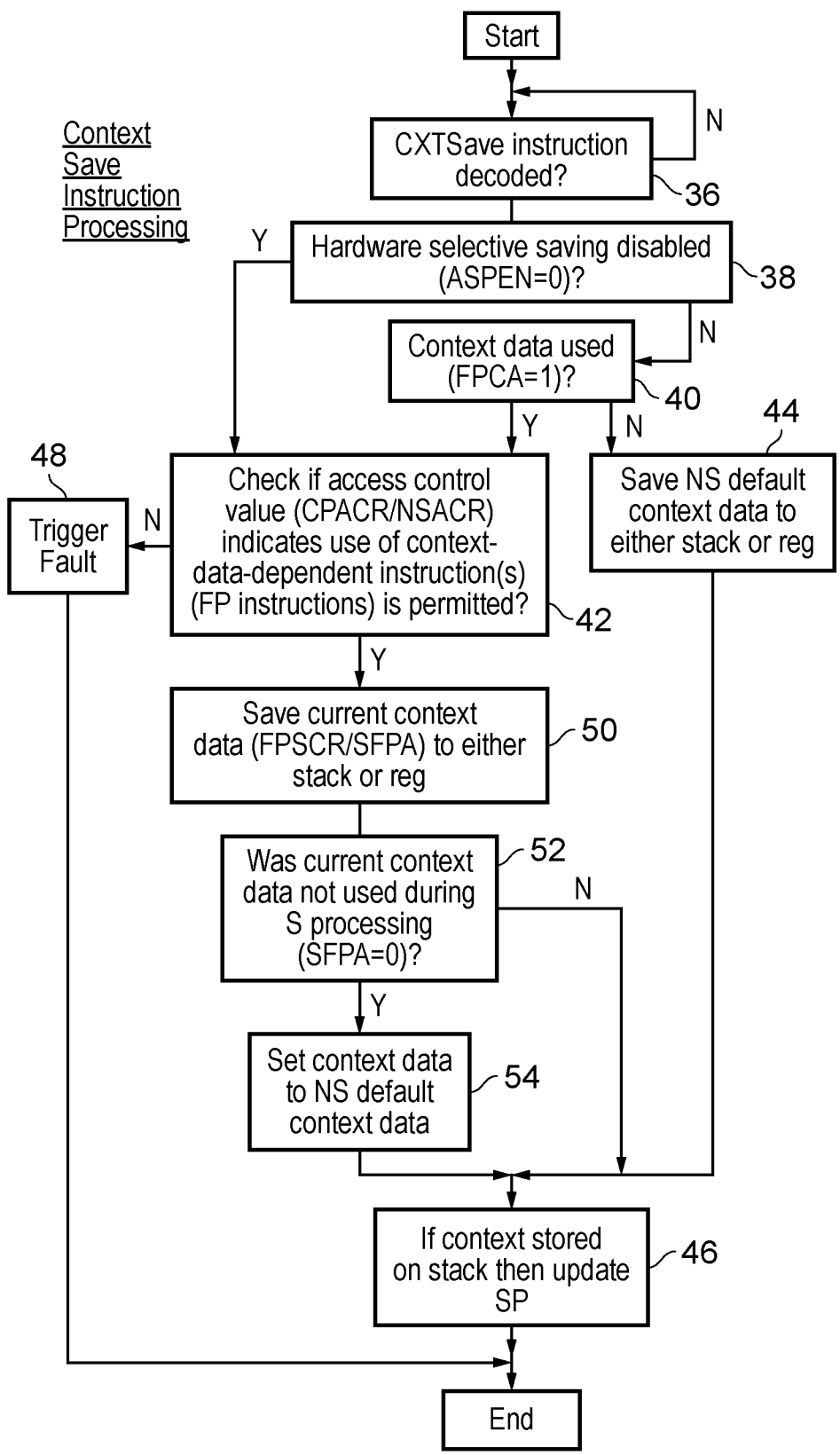
FIG. 2 is a flow diagram schematically illustrating processing associated with execution of a context save instruction.

The present disclosure includes provision of a context save instruction CXTSave and a context restore instruction CXTRestore. FIG. 2 is a flow diagram schematically illustrating processing operations performed by the processing circuitry 20 in response to decoding by the decoder circuitry 16 of a context save instruction. Processing waits at step 36 until a context save instruction is decoded. Step 38 determines whether or not hardware selective saving of context data is disabled. If hardware selective saving is disabled as indicated by the ASPEN flag having a value of "0", then step 40 is bypassed and processing proceeds directly to step 42. If hardware selective saving is not disabled, then processing proceeds to step 40 at which a determination is made as to whether or not the current floating point context data is marked as used (i.e. FPCA=1). If the determination at step 40 is that the context data is not marked as having been used, then processing proceeds to step 44 at which (depending upon instruction variant) default non-secure context data is saved either to stack memory region 10 within the memory 6 as pointed to by the current stack pointer value SP or to a register within the general purpose register file 25 (from where it may be more readily manipulated if this is desired). Step 46 then serves to update the stack pointer value if the context data has been stored to the stack memory region 10.

If the determination at step 40 is that the context data is marked as having been used, then step 42 serves to check the access control values (CPACR/NSACR) stored within the access control register 34 to determine whether use of the floating point program instructions (context-data-dependent instructions) is currently permitted. If such use is not permitted and yet they are marked as having been used, then processing proceeds to step 48 at which a fault is triggered. If the check at step 42 indicates that the access/use of the floating point processing circuitry 22 is permitted, then processing proceeds to step 50 at which the current context data (FPSCR and SFPA) is saved either to the stack memory region 10 or a register (depending upon instruction variant) as previously mentioned. Step 52 determines whether the context data was marked as being used during secure processing (i.e. SFPA=1). If the context data was marked as being used during secure processing, then the control passes to step 46 at which the stack value is updated if the context data was saved to the stack memory region 10 at step 50.

If the check at step 52 indicated that the current context data was not marked as being used during secure processing (SFPA=0), then flow passes to step 54 at which the context data is set to non-secure default context data thereby overwriting any current context data which may have been used during previous non-secure domain processing.

Figure 3:
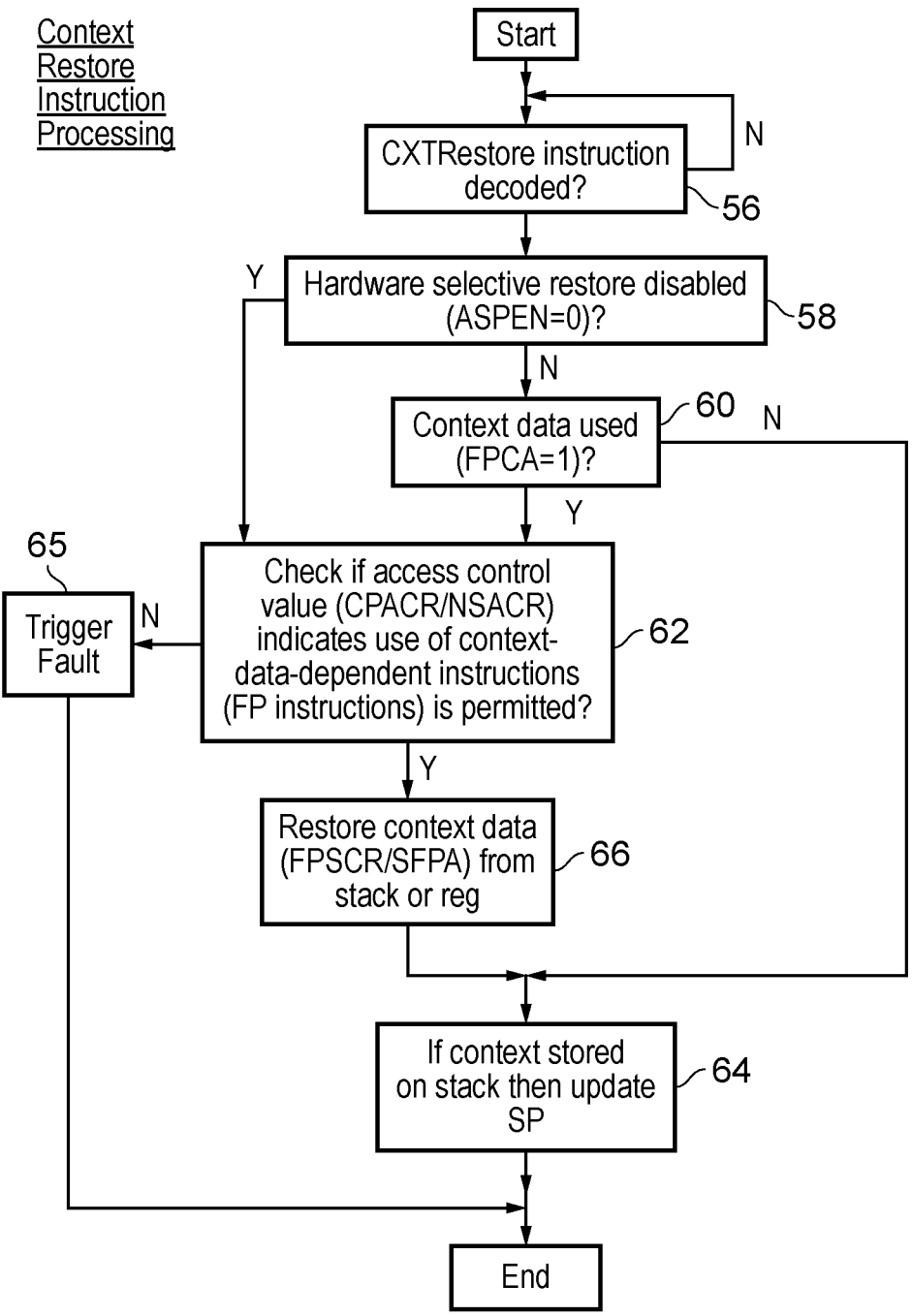
FIG. 3 is a flow diagram schematically illustrating processing associated with execution of a context restore instruction.

FIG. 3 is a flow diagram schematically illustrating processing by the processing circuitry 20 performed in response to decoding of a context restore instruction CXTRestore by the decoder circuitry 16. At step 56 processing waits until a context restore instruction is decoded. Step 58 determines whether hardware selective restore operations are disabled as indicated by the ASPEN flag having a value of 0. If hardware selective restore is disabled, then step 60 is bypassed and processing proceeds to step 62. If hardware selective restore is not disabled, then processing proceeds to step 60 where a determination is made as to whether or not the current context data is marked as having been used (FPCA="1"). If the current context data is marked as not having been used, then a restore operation may be skipped. Nevertheless, when processing proceeds to step 64, if the context restore instruction decoded at step 56 was one which indicated a restore of a context data value or values from the stack memory region 10, then step 64 will serve to update the stack pointer value in a manner consistent with that restore having actually been performed even though the determination at step 60 served to inhibit the restore being performed. When the determination at step 60 is that the context data has been used, then step 62 serves to check the access control values (CPSCR/NSACR) to determine if they indicate that use of the context-data-dependent instructions (floating point instructions) is currently permitted. If such use is not permitted and yet the context data is indicated as having been used, then a fault is triggered at step 65. If the determination at step 62 is that the access control values indicate that use of the context-data-dependent instructions which has occurred is permitted, then processing proceeds to step 66 at which the saved context data (FPSCR and SFPA) is restored either from the stack memory region 10 or from a register depending upon the detailed form of the context restore instruction. Processing then proceeds to step 64 where the stack pointer is updated if the context restore instruction was of the form that restores from the stack memory region 10.

There are two variants of the CXTSave and CXTRestore instructions: memory access instructions that allow FPSCR and SFPA to be directly saved to and restored from the stack, and MOV style instructions that can move FPSCR and SFPA to and from the general purpose register 25 (R[ ]). NOTE: Software can disable hardware management of the floating point (FP) state by setting FPCCR.ASPEN to 0. In such a case the processor can't determine if there is an active FP context. To ensure a safe solution these instructions assume there is an active FP context if ASPEN is 0.

Some examples of how these instructions operate under different conditions are shown in FIGS. 4 to 8. For simplicity these examples only show one secure function. As a result it would be feasible for the compiler to know if an FP instruction had been executed in the secure state. However in real code it is likely there will be many levels of nested secure function calls, possibly spanning libraries from different vendors, which make it impossible to determine at compile time of the gateway secure function if FP has been used whilst in the secure state.

Figure 4:
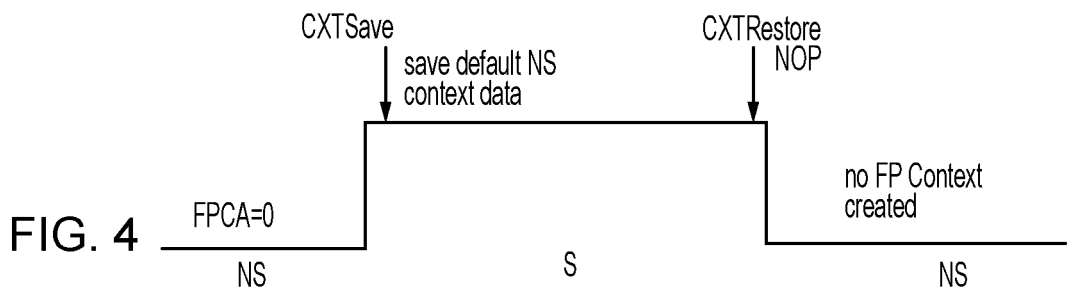

FIG. 4 shows the case where FP is not active (FPCA=0) before a secure function is called, and since no FP instructions are executed during the secure function, FP remain inactive. As a result the CXTSave instruction at the start of the function stores the NS default value of FPSCR (i.e., FPDSCR_NS) along with the value of SFPA to memory. Before the function returns a CXTRestore is executed, which since FP is not active behaves as a NOP. The overall result is that no modifications to the FP state are performed, which is the desired result as the current thread does not have an active FP context, and the data in the FP context data registers 30 may belong to another thread/exception level.

Figure 5:
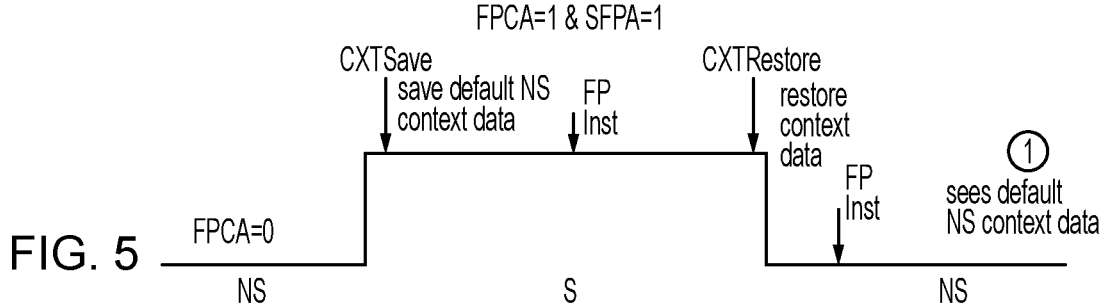

FIG. 5: This example is similar to example 1 in that FP is not active before the call to the secure function, so the CXTSave stores the NS default value to memory. However in this case the secure function executes an FP instruction which causes FPCA to be set to 1. Because there is an active FP state when the CXTRestore is executed at the end of the function it sets FPSCR to the value stored in memory. Because the CXTSave stored the NS default value, the CXTRestore has the effect of initialising the FP state to the NS default value in preparation for returning to the NS state. The first FP instruction executed in the NS state (see point 1) therefore gets the correct FP context.

Figure 6:
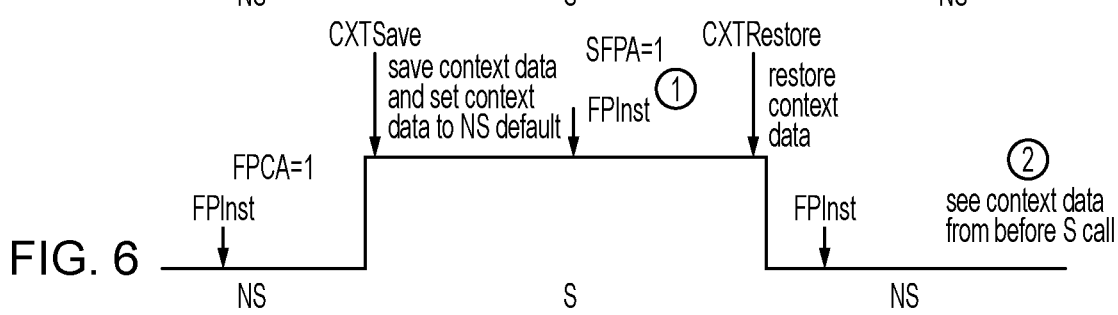

FIG. 6: In this example the thread has an active FP context (FPCA=1) before the secure function is called. As a result the CXTSave at the start of the secure function stores the current values of FPSCR and SFPA to memory, and sets FPSCR to the NS default value (i.e., FPDSCR_NS). At point 1 the first FP instruction is executed in the secure state, this will cause FPSCR to be set to the secure default value (FPDSCR_S) (NOTE: This is due to the SFPA flag being 0 when the FP instruction is executed, which is a feature of the existing architecture). The CXTRestore at the end of the function restores the previous NS value of FPSCR so that the next FP instruction in the NS state (see point 2) sees the same FPSCR value as NS FP instructions before the call to the secure function.

FIG. 7: This example is similar to example 3, however the secure function has two nested calls to non-secure functions, one before, and one after the first use of FP within the secure function. Some existing instructions/features within the architecture mean that at point 2 the secure FP state can be efficiently saved and protected from the non-secure function. These features also mean that the non-secure function will also see the default NS value in FPSCR (just like it would if a call back function in executed from an interrupt handler). The CXTSave at the start of the secure function detects the active FP state (FPCA=1) belongs to the NS state (SFPA=0) and therefore sets FPSCR to the default NS value. As a result the NS function at point 1 does not see the previous NS value of FPSCR, but instead sees the same FPSCR value as the NS function at point 2, IE the NS default value (FPDSCR_NS). This is important as the state visible to NS call back functions should not be dependent upon whether or not the secure function they are being called from has executed a floating point instruction.

FIG. 8: In this example non-secure code calls a gateway secure function, which in turn calls another secure gateway function. Since both the secure functions are gateway functions that can be called from the non-secure state they have use CXTSave and CXTRestore in the function prologue and epilogue.

At point 1 the current context data (FPSCR and SFPA) gets pushed to memory, and FPSCR gets set to the NS default value (FPDSCR_NS).

Since no FP instructions are executed between point 1 and 2, at point 2 the current context data (FPSCR and SFPA) are again pushed to memory, and FPSCR gets set to the NS default value (FPDSCR_NS). Since FPSCR was set to the NS default value (FPDSCR_NS) at point 1, the values pushed to memory at point 2 is the NS default value and not the value FPSCR had before point 1.

At point 3 a secure FP instruction is executed, and as in example 2 it causes a secure FP context to be created. IE SFPA is set to 1 and FPSCR is initialised to the S default value (FPDSCR_S).

At point 4 the CXTRestore restores the context data (FPSCR and SFPA) to the values they had before point 2, that is FPSCR is set to had the NS default value (originally from FPDSCR_NS) and SFPA is set to 0

After the return to the inner secure function a secure FP instruction is executed at point 5. At first sight it looks like this FP instruction could be influenced by the NS default value of FPSCR which was restored in the previous point. However since the CXTSave and CXTRestore save and restore the value of SFPA as well, the original value of SFPA at point 2 (i.e., 0) has been restored. Therefore the FP instruction at point 5 again causes FPSCR to be reinitialised from the safe secure default value (FPDSCR_S).

At point 6 the original context data saved at point 1 is restored such that any subsequent FP instructions executed by the NS function being returned to see the original value of FPSCR before point 1.

FIG. 9 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 may be stored on a computer-readable storage medium (which may be a non-transitory medium), and provides a virtual hardware interface (instruction execution environment) to a guest program 500 which is the same as the hardware interface which would be provided by the real hardware which is the device being modelled by the virtual machine program 510. Thus, the program instructions, including the control of memory accesses described above, may be executed from within the guest program 500 using the virtual machine program 510 to model their interaction with the virtual machine hardware. It will be appreciated that the guest program may be a bare metal application designed to run directly on the hardware (which may be real or virtual), or a guest operating system, which may itself host guest applications.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Apparatus for processing data comprising:
processing circuitry to perform processing operations under control of program instructions;
at least one floating point context data register configured to store context data; and
decoder circuitry to decode said program instructions to generate control signals to control said processing circuitry to perform said processing operations; wherein
said decoder circuitry is responsive to a context-data-dependent program instruction and current context data stored in said at least one floating point context data register to generate said control signals to control said processing circuitry to perform a context-data-dependent processing operation specified by said context-data-dependent program instruction and said current context data,
wherein said decoder circuitry is responsive to a context save instruction:
in response to said current context data being marked as having been used to control a context-data-dependent processing operation, to control said processing circuitry to save said current context data to a data location to be restored to the at least one floating point context data register in response to a subsequent context restore instruction;
in response to said current context data being marked as having been unused to control a context-data-dependent processing operation, to control said processing circuitry to save default context data to said data location to be restored to the at least one floating point context data register in response to the subsequent context restore instruction, and
wherein said default context data is default floating point configuration data.

2. Apparatus as claimed in claim 1, wherein said context-data-dependent program instruction is a floating point program instruction, said current context data is floating point configuration data, and said floating point program instruction specifies a floating point processing operation that is dependent upon said floating point configuration data.

3. Apparatus as claimed in claim 1, wherein said processing circuitry operates in a plurality of domains comprising a secure domain and a non-secure domain, said processing circuitry having access to secure data when operating in said secure domain, said secure data being inaccessible to said processing circuitry when operating in said non-secure domain.

4. Apparatus as claimed in claim 3, wherein, when said current context data has been saved by said processing circuitry and said current context data is marked as unused during processing in said secure domain, said processing circuitry sets said current context data to default context data for said non-secure domain.

5. Apparatus as claimed in claim 4, wherein, when said current context data has been saved by said processing circuitry and said current context data is marked as used during processing in said secure domain, said current context data saved remains in use.

6. Apparatus as claimed in claim 3, wherein said context save instruction controls said processing circuitry to save a security domain indicator flag in dependence upon whether said current context data is marked as used such that:

when said current context data is marked as used, said security domain indicator flag is set to indicate whether said current context data was marked as used by said secure domain; and
when said current context data is not marked as used, said security domain indicator flag is set to a value indicative of not being used by said secure domain.

7. Apparatus as claimed in claim 1, wherein when said processing circuitry is currently unpermitted to use said context-data program instruction, a fault handling exception is triggered in dependence upon whether said current context data is marked as being used.

8. Apparatus as claimed in claim 1, wherein hardware control of selective context data saving is disabled by a software configurable flag such that said current context data is treated as marked as having been used and saved in response to a context save instruction when said hardware control of selective context data saving is disabled.

9. Apparatus as claimed in claim 1, wherein said data location is one of:
a location within a memory; and
a register within a general purpose register file.

10. Apparatus as claimed in claim 1, wherein:
said processing circuitry operates in a plurality of domains comprising a secure domain and a non-secure domain, said processing circuitry having access to secure data when operating in said secure domain, said secure data being inaccessible to said processing circuitry when operating in said non-secure domain; and
said decoder circuitry is responsive to a context restore instruction:
in response to said current context data being marked as having been used to control a context-data-dependent processing operation, to control said processing circuitry to restore said current context data using stored context data, and to restore a security domain indicator flag indicative of whether said secure domain has used said current context data; and
in response to said current context data being marked as having been unused to control a context-data-dependent processing operation, to control said processing circuitry to preserve said current context data.

11. Apparatus as claimed in claim 10, wherein said context-data-dependent program instruction is a floating point program instruction, said current context data is floating point configuration data, and said floating point program instruction specifies a floating point processing operation that is dependent upon said floating point configuration data.

12. Apparatus as claimed in claim 10, wherein when said processing circuitry is currently unpermitted to use said context-data program instruction, a fault handling exception is triggered in dependence upon whether said current context data is marked as having been used.

13. Apparatus as claimed in claim 10, wherein said current context data is one of:
restored from a location within a memory; and
restored from a register within a general purpose register file.

14. Apparatus as claimed in claim 10, wherein hardware control of selective context data saving is disabled by a software configurable flag such that said current context data is treated as marked as having been used in response to a context restore instruction when said hardware control of selective context data saving is disabled.

15. A method of processing data comprising:
performing processing operations with processing circuitry under control of program instructions; and decoding said program instructions to generate control signals to control said processing circuitry to perform said processing operations; wherein said decoding is responsive to a context-data-dependent program instruction and current context data stored in at least one floating point context data register to generate said control signals to control said processing circuitry to perform a context-data-dependent processing operation specified by said context-data-dependent program instruction and said current context data, wherein said decoding is responsive to a context save instruction:

in response to said current context data being marked as having been used to control a context-data-dependent processing operation, to control said processing circuitry to save said current context data to a data location to be restored to the at least one floating point context data register in response to a subsequent context restore instruction;

in response to said current context data being marked as having been unused to control a context-data-dependent processing operation, to control said processing circuitry to save default context data to said data location to be restored to the at least one floating point context data register in response to the subsequent context restore instruction, and wherein said default context data is default floating point configuration data.

16. The method of claim 15, wherein:

said processing circuitry operates in a plurality of domains comprising a secure domain and a non-secure domain, said processing circuitry having access to secure data when operating in said secure domain, said secure data being inaccessible to said processing circuitry when operating in said non-secure domain; and said decoding is responsive to a context restore instruction:

in response to said current context data being marked as having been used to control a context-data-dependent processing operation, to control said processing circuitry to restore said current context data using stored context data, and to restore a security domain indicator flag indicative of whether said secure domain has used said current context data; and in response to said current context data being marked as having been unused to control a context-data-dependent processing operation, to control said processing circuitry to preserve said current context data.

17. A virtual machine computer program for controlling a computer to operate in accordance with the method as claimed in claims 15.

* * * * *